Jan. 21, 1964  H. H. STILLEY  3,118,688
LATERALLY SHIFTABLE HITCH WITH RESILIENT MOUNTING
Filed Dec. 29, 1960  5 Sheets-Sheet 1
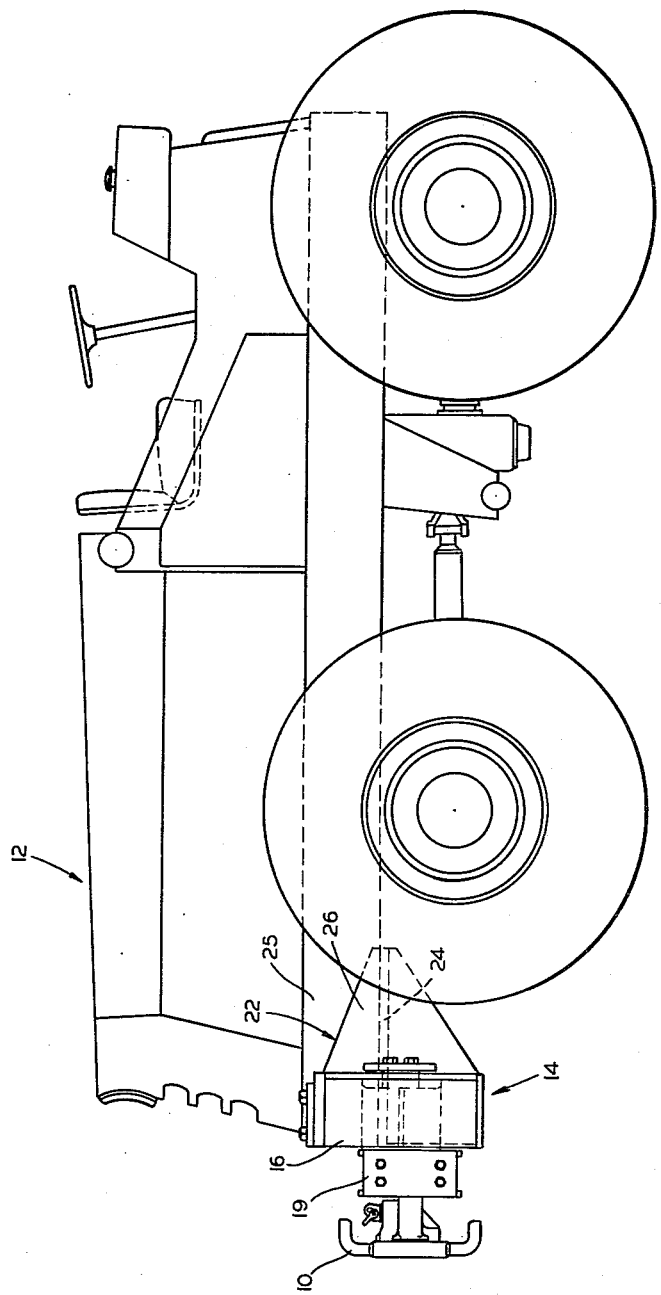
INVENTOR.
HERSCHEL H. STILLEY
BY
Kenneth C. Witt
ATTORNEY

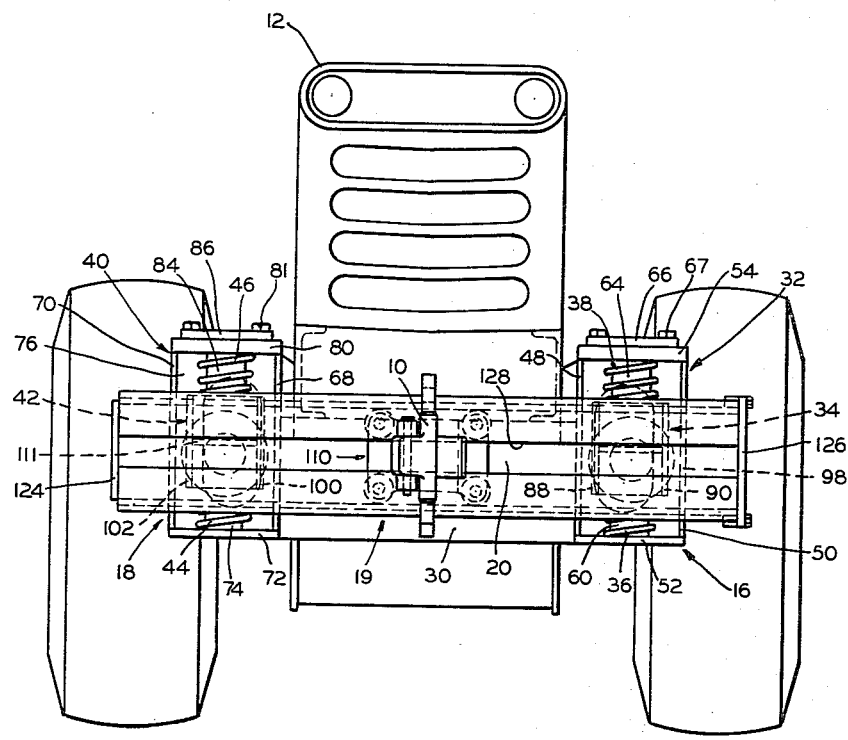

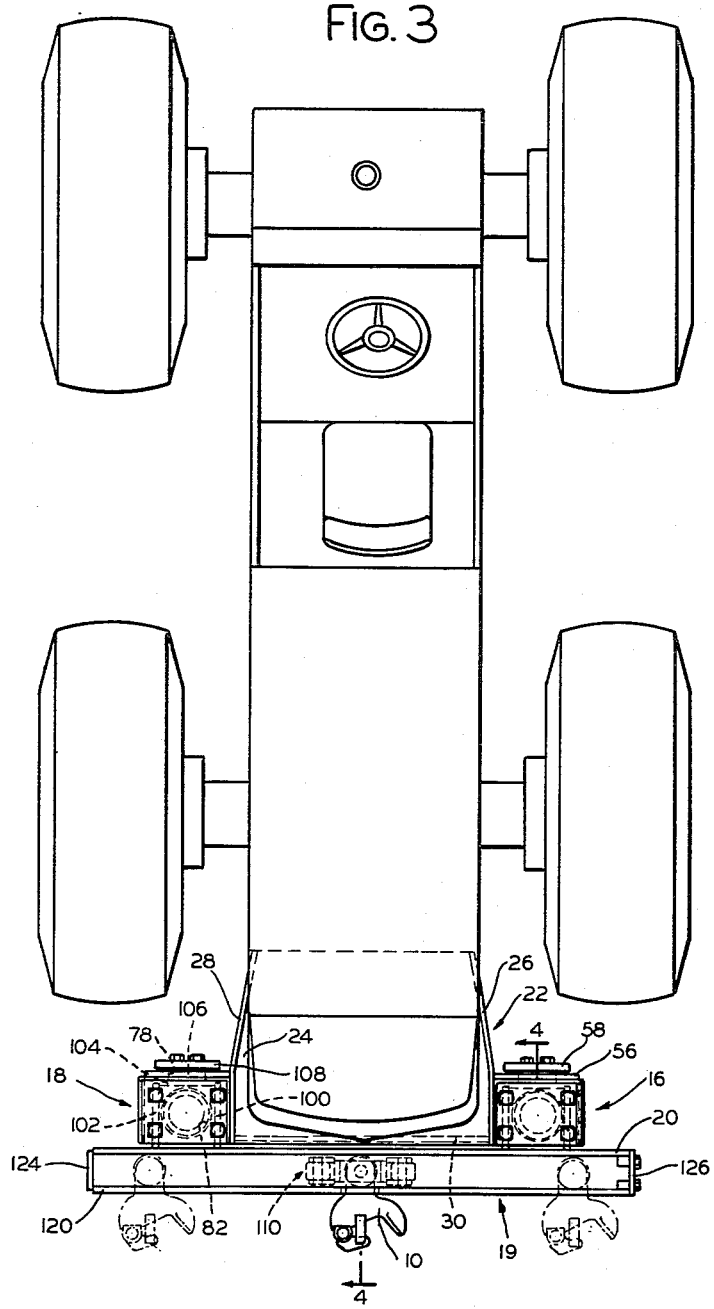

Jan. 21, 1964     H. H. STILLEY     3,118,688
LATERALLY SHIFTABLE HITCH WITH RESILIENT MOUNTING
Filed Dec. 29, 1960     5 Sheets-Sheet 4
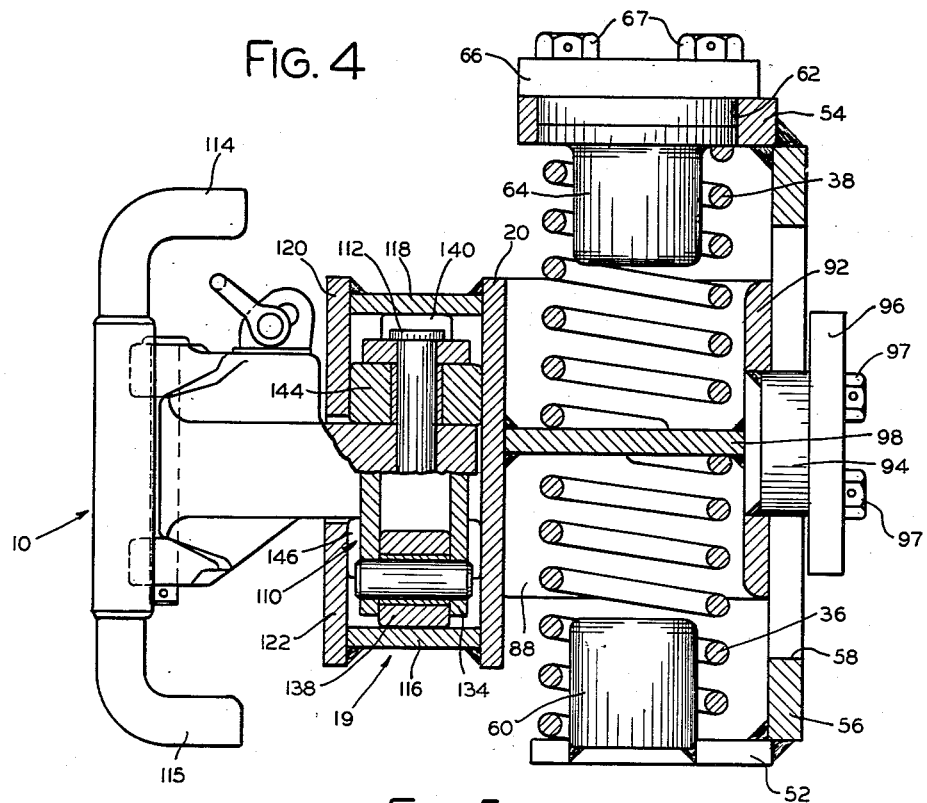
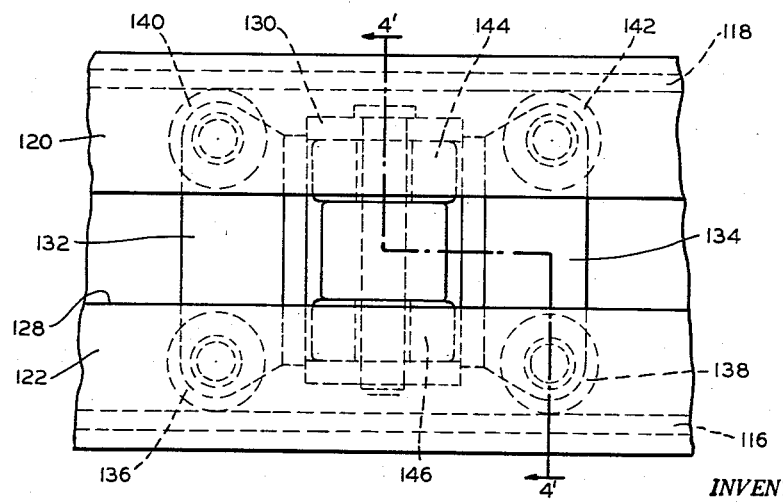
INVENTOR.
HERSCHEL H. STILLEY
BY
Kenneth C. Witt
ATTORNEY Jan. 21, 1964   H. H. STILLEY   3,118,688
LATERALLY SHIFTABLE HITCH WITH RESILIENT MOUNTING
Filed Dec. 29, 1960   5 Sheets-Sheet 5

INVENTOR.
HERSCHEL H. STILLEY
BY
*Kenneth C. Witt*
ATTORNEY

United States Patent Office 3,118,688
Patented Jan. 21, 1964

3,118,688
LATERALLY SHIFTABLE HITCH WITH
RESILIENT MOUNTING
Herschel H. Stilley, St. Joseph, Mich., assignor to Clark
Equipment Company, a corporation of Michigan
Filed Dec. 29, 1960, Ser. No. 79,303
8 Claims. (Cl. 280—447)

This invention relates to resilient mountings, and more particularly to resilient mountings for attaching devices or implements to vehicles.

The invention is disclosed herein in a preferred form for use in attaching a railroad car coupler to a rubber-tired tractor in a manner such that the tractor can pull or push one or more railroad cars. It will be appreciated that in such circumstances it is necessary to provide a mounting for the coupler on the tractor which will permit considerable movement of the coupling laterally and also up and down during transfer of the railroad car or cars by the rubber-tired tractor because the tractor, instead of operating on tracks as a normal railroad locomotive, must operate over ties, switch tracks and other very rough and irregular surfaces, whereas the railroad car to which the tractor is coupled stays at approximately a constant height on the tracks. The coacting coupler on the railroad car ordinarily will have a limited amount of lateral movement and an even smaller amount of vertical movement, but neither of these would be sufficient ordinarily to accommodate the abrupt and substantial movements of the rubber-tired tractor as it passes over ties and other obstructions if the coupler on the tractor were fastened solidly to the tractor.

The object of my invention is to provide a rugged, low-cost, easily manufactured, resilient mounting for attaching implements and devices to vehicles.

In carrying out my invention in the preferred form mentioned previously, a pair of spring support assemblies are secured at one end of a rubber-tired vehicle in transversely spaced apart relation. A transversely disposed track or guide structure is connected between the two spring support assemblies in a manner such that either end may move up or down or both ends may move in either direction simultaneously. A movable carriage mounted on rollers is arranged to operate transversely back and forth in the track, and a railroad type coupling having a pair of stops thereon to prevent coupling disengagement is secured to the movable carriage.

The invention is also disclosed herein in another form for mounting a pusher block on a vehicle.

For a clearer and more complete understanding of my invention reference should be had to the accompanying drawing in which:

FIGURE 1 shows a side elevation of a rubber-tired tractor embodying the present invention in one form;

FIGURE 2 is an end elevation of the same tractor;

FIGURE 3 is a top plan view of the same tractor;

FIGURE 4 is a fragmentary sectional view taken approximately along the line 4—4 in FIG. 3 and line 4'—4' in FIG. 5;

FIGURE 5 is a fragmentary end view showing the carriage;

Figure 6:
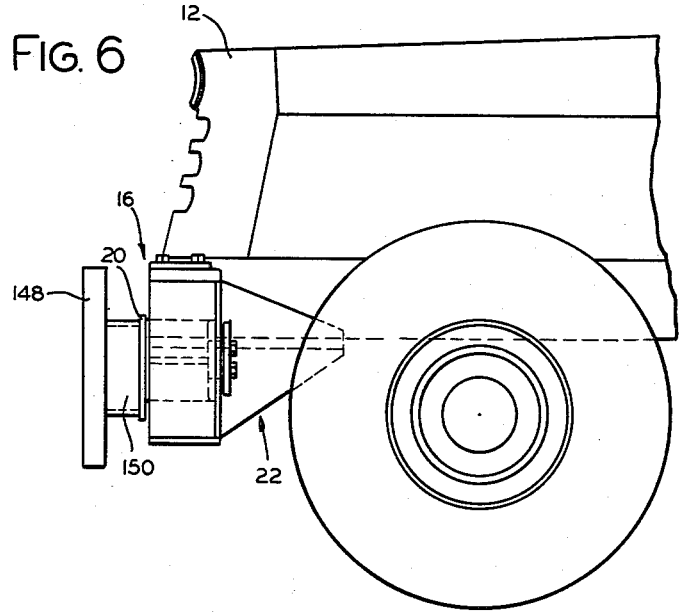
FIGURE 6 is a partial side elevation of a vehicle having a pusher block mounted thereon by means of the present invention.

Referring now to FIG. 1 of the drawing, the numeral 10 denotes a railroad coupling which is mounted on the rearward end of a rubber-tired tractor 12 by means of a resilient mounting 14. The resilient mounting 14 comprises a pair of spring support assemblies 16 and 18 (see FIGS. 2 and 3) and a transverse guide or track structure which is indicated generally by the numeral 19. The resilient mounting 14 is attached to the tractor 12 by means of a support or bracket structure 22 which includes a horizontal plate 24 adapted to be secured to the bottom of the frame 25 of the tractor by any suitable means such as bolting. The bracket structure 22 also includes a pair of vertically disposed plates 26 and 28 which, as explained hereinafter, form a part respectively of the spring support assemblies 16 and 18 and preferably are welded to the plate 24. The bracket structure also includes a brace portion 30 preferably welded to and extending between the vertical plates 26 and 28 and along and below the rear edge of the mounting plate 24.

Referring now to FIGS. 2, 3 and 4 the spring support assembly 16 comprises an outer fixed box structure 32, an inner vertically movable member 34 and a pair of helical springs 36 and 38 disposed vertically between the fixed structure 32 and the movable member 34 in a manner such that the movable member 34 can move reciprocally in a vertically disposed path relative to the fixed structure 32. The spring support assembly 18 similarly comprises an outer fixed box structure 40, an inner movable member 42 and a pair of helical springs 44 and 46 disposed vertically between the fixed box structure 40 and the movable member 42. The movable mounting members 34 and 42 are interconnected by transverse connecting plate 20 which is preferably attached to the movable members by welding and forms a portion of the movable support or guide structure 19.

The fixed structure 32 is a box-like structure with an open front (facing to the rear of the vehicle) and having the inner side 48 formed from a portion of the vertical bracket plate 26. The remainder of the fixed structure 32 comprises an outer side plate or wall 50, a bottom plate 52, a top plate 54 and a back plate 56 with a vertically disposed elongated opening 58 therein. The entire fixed structure just described is preferably welded together to form a rigid unitary structure. Attached to the bottom plate 52, preferably by welding, is an upwardly extending centrally disposed circular spring positioner 60 which fits within helical spring 36 and cooperates with the movable member 34 to hold it in position. The top plate 54 has a circular opening 62 therein through which a removable spring positioner 64 extends. The spring positioner 64 has a flange portion 66 which is attached to the top plate 54 by any suitable means, such as by machine screws 67. The fixed structure 40 is similar to fixed structure 32 and comprises an inner side portion 68 formed by a portion of vertical bracket plate 28, an outer side plate or wall 70, a bottom plate 72 having a spring positioner 74 attached thereto, a back plate 76 with a vertically disposed elongated opening 78 therein, a top plate 80 with a circular opening 82 therein and a removable spring positioner 84 extending through circular opening 82 and having a flange portion 86 attached to the top plate 80 by any suitable means, such as by machine screws 81.

The inner movable member 34 of spring support assembly 16 is preferably a welded assembly comprising a pair of parallel side plates 88 and 90 (see FIG. 2) attached to transverse connecting plate 20 in spaced apart relationship by any suitable means, such as welding, a back plate 92, a rearwardly extending guide member 94 attached to back plate 92, a removable retainer plate 96 attached to guide 94 by any suitable means such as by machine screws 97, and a divider plate 98 which divides movable member 34 into two spring retaining compartments. The clearance between the retainer plate 96 and the back plate 92 permits vertical reciprocal movement of movable member 36 relative to fixed structure 32 with a minimum of fore and aft movement. The inner movable member 42 of spring support 18 is similar to movable member 34 and comprises a pair of side plates 100 and 102, a back plate 104, a guide 106, a removable retainer plate 108 and a divider plate 111. The guides 94 and 106 have a width which is less than the width of the elongated openings 58, 78 and are positioned loosely in the elongated openings 58 and 78, respectively, in order to permit the transverse track 19 to twist or pivot about a longitudinal horizontal axis.

It will be readily appreciated in view of the foregoing that I have disclosed an exemplary resilient mounting which is capable of being easily assembled or disassembled merely by attaching or removing, as the case may be, a pair of removable spring positioners 64 and 84 and a pair of removable retainer plates 96 and 108.

From the foregoing description it will be appreciated that by virtue of the arrangement of a pair of spring support assemblies 16 and 18 interconnected by transverse track structure 19, either the tractor 12 or the transverse track structure 19 can move vertically relative to the other, or, due to the individual action of spring support assemblies 16 and 18, pivot about a longitudinal horizontal axis located at the center of the track 19 or at a point on track 19 on a line connecting the centers of guides 94 and 108 or on an extension of such line.

The coupler 10 is pivotally attached to a coupler carriage 110 by means of a pin 112 (see FIG. 4) and has a pair of stops 114 and 115 to prevent disengagement from coupler 10 of a mating coupler on a railroad car by virtue of excessive vertical movement between them. The coupler carriage 110 is movably mounted in transverse guide or track structure 19 which comprises a pair of upper and lower plates 116 and 118 attached to vertical transverse plate 20 by any suitable means such as welding in parallel spaced apart relationship an upper front plate 120 attached to the plate 118, a lower front plate 122 attached to the plate 116, an end plate 124 closing one end of transverse track structure 19 and a removable cover plate 126 closing the other end of transverse track structure 19. The upper and lower front plates 120 and 122 are spaced apart thereby forming a transversely disposed opening 128 through which coupler 10 extends.

Referring to FIG. 5, the coupler carriage 110 comprises a rectangular frame 130 to which a pair of vertically disposed, laterally projecting bifurcated roller holders 132 and 134 are attached. Rotatably mounted at the bottoms of the holders 132 and 134, respectively, are rollers 136 and 138 which are arranged to roll along bottom plate 116. At the tops of the respective holders are rollers 140 and 142 which are arranged to roll along top plate 118. The pin 112 passes through frame 130 and has rotatably mounted thereon a pair of horizontally disposed rollers 144 and 146 which are arranged to roll along between front plates 120 and 122, respectively, and transverse connecting plate 20.

Assuming now that it is desired to move a railway car, the coupler 10 is coupled with the coupler of the railway car. The tractor 12 can now either push or pull the railway car to the desired location. It will be appreciated that since the coupler 10 can be moved freely along the track 19 to either of the extreme positions shown in phantom view in FIG. 3, a limited amount of lateral adjustment is available.

Furthermore, any vertical movement or relative pivoting or twisting movement between the tractor 12 and the railway car due to the tractor 12 not running on the rails along which the railway car operates is absorbed by the resilient mounting 14.

Figure 7:
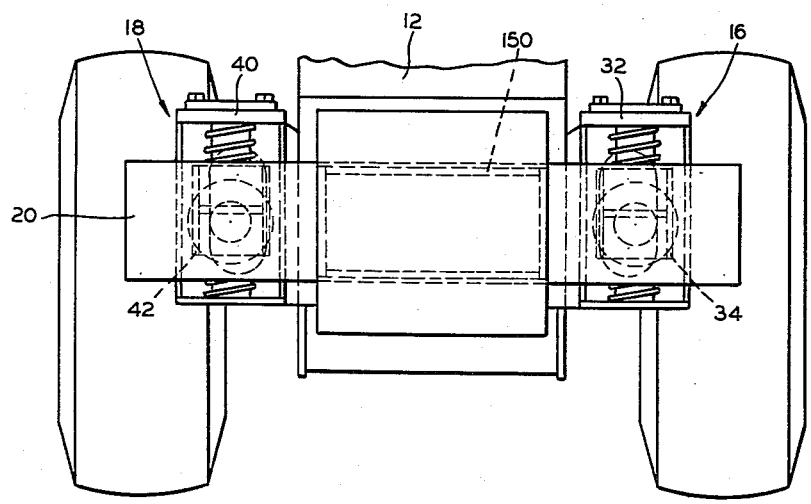
FIGURE 7 is a partial end elevation of the vehicle of FIG. 6.

Turning now to FIGS. 6 and 7 in which parts corresponding to similar parts in FIGS. 1–5 have like reference numerals and operate similarly, the resilient mounting 14 is shown in conjunction with a pusher block 148 which is fixedly attached to the transverse connecting plate 20 by a rectangular supporting frame 150. The resilient mounting 14 can be used advantageously to mount such a pusher block on a tractor.

Under certain operating conditions, some off-the-road construction vehicles, of which a scraper is exemplary, require additional power. In these cases a tractor equipped with a pusher block may be used to supply the additional needed power by pushing with the pusher block in abutment with a corresponding portion of the vehicle being pushed. Since the terrain over which such vehicles generally operate is uneven and the vehicles are not coupled together, it is desirable to provide a mounting which allows the pusher block to move relative to the tractor so that the best possible contact is maintained between the pushed vehicle and the pusher block in order to avoid undue strain on the vehicles.

While I have disclosed herein preferred embodiments of my invention in conjunction with two types of load contacting means, namely, a railway coupler and a pusher block, those skilled in the art may perceive other types of load contacting means as well as other modifications and changes based on the foregoing description, therefore, I intend to be limited only by the scope and spirit of the appended claims.

I claim:

1. A resilient mounting comprising a pair of spring support assemblies disposed in fixed laterally disposed relationship, each said assembly comprising an outer fixed member having an open front and a back having an elongated vertically disposed opening therein, an inner movable member partially disposed within said outer member, a pair of springs located between said members in vertical opposed relationship such that said members can move vertically relative to each other, and means for holding said inner movable member from fore and aft movement relative to said outer member, including said back, means connected to said inner movable member and extending through said elongated opening and retaining means connected to said last-mentioned means outwardly of said back and a transversely disposed interconnecting plate rigidly connected to both of the said inner movable members, the said movable members being movable individually whereby the said connecting plate is pivotal about a shiftable longitudinally extending axis.

2. A resilient mounting comprising a pair of spring support assemblies disposed in fixed laterally disposed relationship, each said assembly comprising an outer member having an open front and a back, said back having an elongated vertically disposed opening therein of uniform width, a movable member partially disposed within said outer member, a pair of springs located between said members in vertically opposed relationship such that said members can move vertically relative to each other, and means extending through said elongated opening for holding said movable member from forward movement relative to said outer member, said means comprising a guide member of less than said uniform width fixedly attached to said movable member and extending through said elongated opening and a retainer means attached to said guide member outwardly of said back, and a transverse connecting plate fixedly attached to said movable members, whereby said connecting plate can move vertically or twist relative to said spring support assemblies.

3. A resilient mounting comprising a pair of spring support assemblies disposed in fixed laterally disposed relationship, each said assembly comprising an outer member having an open front and a back, said back having an elongated vertically disposed opening therein of uniform width, a movable member partially disposed within said outer member, a pair of springs located between said members in vertically opposed relationship such that said members can move vertically relative to each other, and means extending through said elongated opening for holding said movable member from forward movement relative to said outer member, said means comprising a guide member of less than said uniform width fixedly attached to said movable member and extending through said elongated opening and a retainer plate attached to said guide member outwardly of said back, a transversely disposed track structure rigidly connected to both of the said movable members whereby the track structure can move vertically or twist relative to said spring support assemblies, and a carriage adapted to traverse the said track structure.

4. A resilient mounting comprising a pair of laterally spaced apart spring support assemblies interconnected by a horizontally extending fixed support member and a horizontally extending movable support member, each spring support assembly comprising a vertically disposed outer fixed structure secured to the said fixed support member, a movable member located at least partly within the said fixed structure and secured to the said movable support member, resilient means located above and below the said movable member and between the movable member and the said fixed structure for normally holding the movable member in a neutral position but providing relative movement of the movable member up and down from the neutral position relative to the fixed support structure, the said fixed support structure including a wall having a vertically disposed elongated slot therein, and means mounted on the said movable member extending through the said slot for guiding the up and down movements of the movable member and preventing significant motion of the movable member normal to the said elongated slot, the said movable members being movable vertically simultaneously in the same sense whereupon the said movable support members moves vertically in the same sense, the said movable members being movable vertically simultaneously in opposite senses whereupon the said movable support member pivots about a longitudinally extending axis, and one of the said movable members being movable vertically without vertical movement of the other movable member whereupon the said movable support member pivots about a longitudinally extending axis.

5. In a vehicle, a horizontally extending fixed support member secured in transverse relation at one end of the vehicle, a pair of spring support assemblies secured respectively at the ends of the said fixed support member, each spring support assembly including a fixed structure secured to the said fixed support member, the said fixed structure comprising a vertically disposed box structure having an open front and a back provided with an elongated vertically disposed opening therein of uniform width, a movable member partially disposed within the said fixed structure, a pair of springs located between the said movable member and the said fixed structure above and below the said movable member in vertically opposed relationship whereby the movable member can move upwardly and downwardly relative to the fixed structure, and means for preventing significant fore and aft movement of the said movable member relative to the fixed structure comprising said back, a guide member of less than said uniform width attached to said movable member and extending through said elongated opening and a retainer plate attached to said guide member outside the said back, a transversely disposed track structure rigidly connected to both of the said movable members whereby the ends of the track structure can move vertically relative to the said fixed structure in the same and opposite senses, a roller carriage adapted to traverse the said track structure freely from one end to the other, and a railroad coupler pivotally connected about a vertically disposed axis to the said carriage.

6. In a vehicle, a horizontally extending fixed support member secured in transverse relation at one end of the vehicle, a pair of spring support assemblies secured respectively at the ends of the said fixed support member, each spring support assembly including a fixed structure secured to the said fixed support member, the said fixed structure comprising a vertically disposed box structure having an open front and a back provided with an elongated vertically disposed opening therein of uniform width, a movable member partially disposed within the said fixed structure, a pair of springs located between the said movable member and the said fixed structure above and below the said movable member in vertically opposed relationship whereby the movable member can move vertically relative to the fixed structure, and means for preventing significant fore and aft movement of the said movable member relative to the fixed structure comprising said back, a guide member of less than said uniform width attached to said movable member and extending through said elongated opening and a retainer plate attached to said guide member outside the said back, a horizontally extending movable support member interconnecting the said two movable members, and an outwardly extending pusher plate rigidly secured to the said movable support member.

7. In a vehicle, a pair of spring support assemblies secured to the vehicle and disposed in fixed laterally spaced relationship, each said assembly including an outer member having an open front and a back, said back having an elongated vertically disposed opening therein of uniform width, a movable member partially disposed within said outer member, a pair of springs located between said members in vertically opposed relationship such that said members can move vertically relative to each other, means for holding said movable member from fore and aft movement relative to said outer member, said means including said back, a guide member of less than said uniform width fixedly attached to said movable member and extending through said elongated opening and a retainer means connected to said guide member, a transverse connecting plate fixedly attached to said movable member, so that said connecting plate can move vertically or twist relative to said spring support assemblies, and load contacting means carried by said connecting plate.

8. For use in an elongated vehicle, a horizontal extending fixed support member secured in transverse relation at one end of the vehicle, a pair of spring support assemblies secured respectively at the ends of the said fixed support member, each spring support assembly including a fixed structure secured to the said fixed support member, the said fixed structure comprising a vertically disposed box structure having an open front and a back provided with an elongated vertically disposed opening therein of uniform width, a movable member partially disposed within the said fixed structure, a pair of springs located between the said movable member and the said fixed structure above and below the said movable member in vertically opposed relationship whereby the movable member can move upwardly and downwardly relative to the fixed structure, and means for preventing significant fore and aft movement of the said movable member relative to the fixed structure comprising said back, a guide member of less than said uniform width attached to said movable member and extending through said elongated opening and a retainer plate attached to said guide member outside the said back, a transversely disposed connecting plate connected to both of the said movable members so that the ends of the connecting plate can move vertically relative to the said fixed structure in the same and opposite senses, and load contacting means carried by said connecting plate.

References Cited in the file of this patent

UNITED STATES PATENTS

| | | |
|---|---|---|
| 1,304,276 | Haeseleer | May 20, 1919 |
| 1,314,982 | Reed | Sept. 2, 1919 |
| 1,326,551 | Turnbull | Dec. 30, 1919 |
| 2,091,668 | Bradford | Aug. 31, 1937 |
| 2,150,269 | Dreisbach | Mar. 14, 1939 |
| 2,287,234 | Ducharme | June 23, 1942 |
| 2,531,289 | Murat | Nov. 21, 1950 |
| 2,919,142 | Winget | Dec. 29, 1959 |